(12) United States Patent
Zhang et al.

(10) Patent No.: US 10,366,671 B2
(45) Date of Patent: Jul. 30, 2019

(54) METHOD AND APPARATUS FOR CONTROLLING TRANSMISSION OF VBO SIGNAL AND DISPLAY TERMINAL

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventors: Shili Zhang, Qingdao (CN); Haoqiang Fang, Qingdao (CN); Qinghua Tian, Qingdao (CN)

(73) Assignees: HISENSE ELECTRIC CO., LTD., Shandong (CN); HISENSE USA CORPORATIONGA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/590,948

(22) Filed: May 9, 2017

(65) Prior Publication Data

US 2018/0114504 A1    Apr. 26, 2018

(30) Foreign Application Priority Data

Oct. 26, 2016  (CN) .......................... 2016 1 0946596

(51) Int. Cl.
*G09G 5/00*  (2006.01)
*G09G 3/20*  (2006.01)
(Continued)

(52) U.S. Cl.
CPC .............. *G09G 5/008* (2013.01); *G09G 3/36* (2013.01); *G09G 5/006* (2013.01);
(Continued)

(58) Field of Classification Search
CPC ..... G09G 5/008; G09G 2370/04; H04N 7/015
See application file for complete search history.

(56) References Cited

U.S. PATENT DOCUMENTS

| | | | |
|---|---|---|---|
| 9,036,081 B2* | 5/2015 | Ozawa | ..................... H04N 7/06 348/441 |
| 2014/0173360 A1* | 6/2014 | Lee | ..................... H04L 25/0272 714/47.1 |

FOREIGN PATENT DOCUMENTS

| | | |
|---|---|---|
| CN | 104243888 A | 12/2014 |
| CN | 104683714 A | 6/2015 |
| JP | 2004-249466 A | 9/2004 |

OTHER PUBLICATIONS

V-By-One HS Standard, Version 1.0, May 26, 2008, Thine Electronics, Inc.*
(Continued)

*Primary Examiner* — Xuemei Zheng
(74) *Attorney, Agent, or Firm* — J.C. Patents

(57) ABSTRACT

The present application discloses a method and an apparatus for controlling transmission of a VBO signal and a display terminal. The method is applied in the display terminal, where the display terminal includes a mainboard and a Tcon board which use a VBO interface for communications, and the method includes: after a system is powered on, performing multiple interactions between the Tcon board and the mainboard according to a VBO signal transmission protocol; after each of the interactions, acquiring, by the Tcon board, a timing control signal by parsing valid image data of a received VBO signal transmitted by the mainboard, and if the timing control signal acquired by parsing successively satisfies a preset condition in a preset number of handshakes, then stopping repeating the interaction, and only performing transmission of display image data in the VBO signal.

20 Claims, 7 Drawing Sheets

(51) Int. Cl.
*G09G 3/36* (2006.01)
*H04N 7/015* (2006.01)
(52) U.S. Cl.
CPC ... *G09G 2330/026* (2013.01); *G09G 2340/14* (2013.01); *G09G 2370/04* (2013.01); *H04N 7/015* (2013.01)

(56) References Cited

OTHER PUBLICATIONS

The Chinese First Examination Report of corresponding Chinese patent application No. 201610946596.3, dated Oct. 29, 2018.

* cited by examiner

METHOD AND APPARATUS FOR CONTROLLING TRANSMISSION OF VBO SIGNAL AND DISPLAY TERMINAL

CROSS REFERENCE TO RELATED APPLICATIONS

The present application claims priority to Chinese Patent Application No. 201610946596.3, filed on Oct. 26, 2016 and entitled "METHOD AND APPARATUS FOR CONTROLLING TRANSMISSION OF VBO SIGNAL AND DISPLAY TERMINAL", which is hereby incorporated by reference in its entirety.

TECHNICAL FIELD

The present application relates to the field of signal processing techniques and, in particular, to a method and an apparatus for controlling transmission of a VBO signal and a display terminal.

BACKGROUND

V-By-One, VBO for short, is a digital interface standard technology directing at image information transmission. This technology may support high speed signal transmission of up to 4.0 Gbps, and a delay between data and a clock at a receiving end is avoided due to its specific encoding manner, thus the VBO technology is widely used in the field of ultrahigh-definition LCD TVs, making ultra-thin and ultra-narrow TVs available.

During transmission of a VBO signal, display communications are initiated after a successful handshake between a Tcon board and a mainboard to perform transmission of the VBO signal. In the VBO signal, in addition to a data signal, a timing control signal embedded in the data signal is also included.

SUMMARY

The present application provides a method and an apparatus for controlling transmission of a VBO signal and a display terminal.

A method for controlling transmission of a V-By-One (VBO) signal for use in a display terminal, where the display terminal includes a mainboard and a Tcon board which use a VBO interface for communications, and the method includes:

after a system is powered on, performing multiple interactions between the Tcon board and the mainboard according to a VBO signal transmission protocol, wherein the interaction comprises a handshake and transmission of the VBO signal after the handshake is completed;

after each of the interactions, acquiring, by the Tcon board, a timing control signal by parsing valid image data of a received VBO signal transmitted by the mainboard, and if the timing control signal acquired by parsing successively satisfies a preset condition in a preset number of handshakes, then stopping repeating the interaction, and only performing transmission of display image data in the VBO signal.

An apparatus for controlling transmission of a VBO signal for use in a display terminal, where the display terminal includes a mainboard and a Tcon board which use a VBO interface for communications, and the apparatus includes a memory storing instructions; a processor coupled with the memory and configured to execute instructions stored in the memory, and the processor is configured to:

after a system is powered on, control the Tcon board to perform multiple interactions between the Tcon board and the mainboard according to a VBO signal transmission protocol, wherein the interaction comprises a handshake and transmission of the VBO signal after the handshake is completed;

after each of the interactions, control the Tcon board to acquire a timing control signal by parsing valid image data of a received VBO signal transmitted by the mainboard, and if the timing control signal acquired by parsing successively satisfies a preset condition in a preset number of handshakes, then stop repeating the interaction, and only perform transmission of display image data in the VBO signal.

A display terminal including: a liquid crystal display panel, a mainboard, a Tcon board and an apparatus for controlling transmission of a VBO signal, where the apparatus for controlling the transmission of the VBO signal is used to control image display in the liquid crystal display panel;

where the apparatus for controlling the transmission of the VBO signal includes a memory storing instructions; a processor coupled with the memory and configured to execute instructions stored in the memory, and the processor is configured to:

after a system is powered on, control the Tcon board to perform multiple interactions between the Tcon board and the mainboard according to a VBO signal transmission protocol, wherein the interaction comprises a handshake and transmission of the VBO signal after the handshake is completed;

after each of the interactions, control the Tcon board to acquire a timing control signal by parsing valid image data of a received VBO signal transmitted by the mainboard, and if the timing control signal acquired by parsing successively satisfies a preset condition in a preset number of handshakes, then stop repeating the interaction, and only perform transmission of display image data in the VBO signal.

BRIEF DESCRIPTION OF DRAWINGS

The drawings herein are incorporated into the specification and constitute a part of the specification, which illustrate embodiments in conformity with the present application, and are used together with the specification to explain principles of the present application.

DESCRIPTION OF EMBODIMENTS

Exemplary embodiments will be described herein in detail, examples of which are illustrated in the accompany drawings. When descriptions hereunder involve the drawings, the same numeral in different drawings represents the same or similar elements unless indicated otherwise. Implementations described in the following exemplary embodiments are not representative of all implementations in compliance with the present application. On the contrary, they are examples of the apparatus and the method as described detailedly in the appended claims, which are merely in compliance with some aspects of the present application.

In the related art, for the transmission of the VBO signal performed in the display communication after a successful handshake, the timing control signal will be probabilistically unstable, that is, the timing control signal in the VBO signal is unstable or goes beyond settings of the Tcon board, thereby rendering that the timing control signal embedded in the VBO signal appears to be abnormal when the Tcon board resolves a display image data signal and a timing control signal directly from valid image data of the VBO signal to perform displaying, and the Tcon board cannot correctly resolve the display image data from the received VBO signal, leading to an abnormality in screen display.

Figure 1:
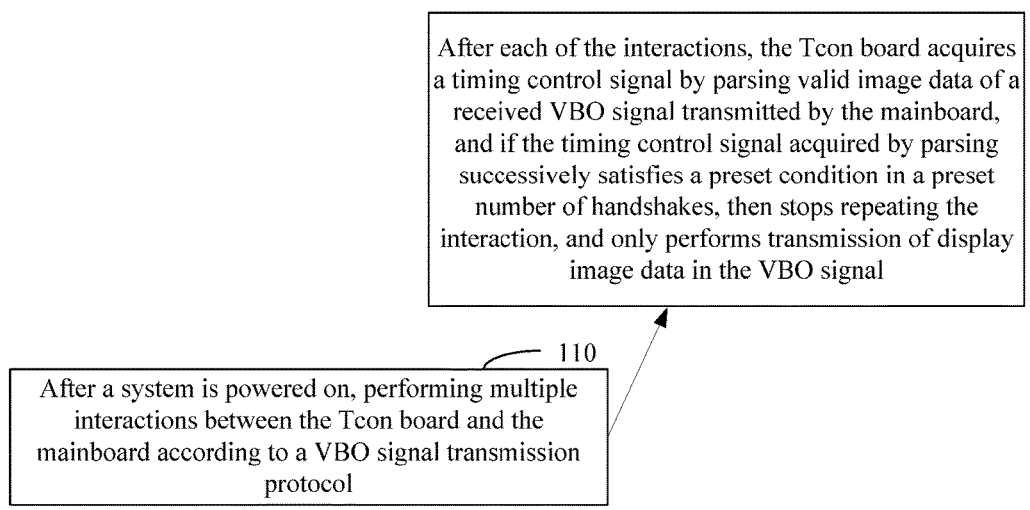
FIG. 1 is a flow chart of a method for controlling transmission of a VBO signal according to some embodiments of the present application.

FIG. 1 is a flow chart of a method for controlling transmission of a VBO signal according to some embodiments of the present application. The method for controlling the transmission of the VBO signal is applied in a display terminal, where the display terminal includes a mainboard and a Tcon board which use a VBO interface for communications. As shown in FIG. 1, the method for controlling the transmission of the VBO signal may include the following steps.

In step 110, after a system is powered on, performing multiple interactions between the Tcon board and the mainboard according to a VBO signal transmission protocol.

In the step 110 as executed, the interaction includes two procedures, which are respectively a handshake and transmission of the VBO signal after the handshake procedure is completed. Alternatively, the transmission of the VBO signal may be, for example, after the Tcon board and the mainboard finish a handshake, the mainboard transmits a VBO signal to the Tcon board, and then the Tcon board receives the VBO signal. For each interaction, after completion of each interaction, that is, after transmission of the VBO signal, the Tcon board may acquire a timing control signal by parsing valid image data of a received VBO signal transmitted by the mainboard, and if the timing control signal acquired by parsing successively satisfies a preset condition in a preset number of handshakes, then stop repeating the interaction, and only perform transmission of display image data in the VBO signal; whereas if the timing control signal acquired by the Tcon board by parsing the valid image data of the received VBO signal transmitted by the mainboard after the current handshake does not satisfy a preset condition relative to a timing control signal in a previous handshake, the Tcon board proceeds with a next interaction with the mainboard, that is, a further handshake, then performs the transmission of the VBO signal, and proceeds to repeat the above process where the Tcon board acquires the timing control signal by parsing the valid image data of the received VBO signal transmitted by the mainboard, and determines whether it is necessary to repeat the interaction according to the preset condition.

Transmission performed by the VBO signal which serves as an image signal is used to achieve image display in the display terminal. The timing control signal and the display image data are included in the valid image data of the VBO signal. In the display terminal, the mainboard acts as a transmitting end of the VBO signal, corresponding to which, the Tcon board acts as a receiving end of the VBO signal.

The timing control signal is used to provide an HSYNC (Horizontal Synchronization), a VSYNC (Vertical Synchronization) and a DE (Data Enable) as required for ensuring a normal display in the display terminal. Therefore, correspondingly to this, the timing control signal includes an htotal signal, a Vtotal signal and an HDE signal, which achieve the HSYNC, the VSYNC and the DE respectively.

In the VBO signal, the timing control signal is embedded in the valid image data. Thus, for the Tcon board which serves as the receiving end, it can acquire by parsing the timing control signal from the valid image data of the VBO signal after receiving the VBO signal.

Since the timing control signal is used to ensure the normal display in the display terminal, for the VBO signal transmitted after a successful handshake, the timing control signal embedded in the valid image data may be at an unstable state in a short time, or may have been at a stable state.

The above interaction will be described hereunder in detail.

After the handshake is successfully completed between the Tcon board and the mainboard, the mainboard performs transmission of the VBO signal immediately. After receiving the VBO signal, the Tcon board is capable of acquiring by parsing a timing control signal from the valid image data of the VBO signal, and comparing the timing control signal resolved at this time with a timing control signal (if in existence) resolved previously, if the timing control signal acquired by parsing during the handshake satisfies a preset condition relative to the timing control signal during the previous handshake, which occurs for a successive preset number of handshakes, then the Tcon board and the mainboard stop repeating handshake, and only perform transmission of display image data in the VBO signal.

The preset condition is used to indicate a range of deviation the timing control signal covers relative to the timing control signal acquired by parsing after the previous successful handshake. The preset condition will be used to identify whether the timing control signal is identical to or approximately identical to the timing control signal acquired by parsing after the previous successful handshake.

Where the preset condition will be used to identify whether the timing control signals have an identical cycle and an approximately identical amplitude, and compare the timing control signal acquired by parsing after the previous handshake with the timing control signal currently acquired by parsing, when the preset condition is satisfied by the two timing control signals, then the timing control signal will be conceived as a stable signal.

In some exemplary embodiments, the condition may be set to three cases where cycle lengths are approximately identical, cycle lengths and amplitudes are both approximately identical, and differences in the cycle lengths and in the amplitudes are within a preset identification requirement, the preset condition may be any of the three cases, which will not be limited herein, and can be flexibly adjusted according to actual operation requirements.

As can be seen, during multiple handshakes, it needs to determine, after each of the interactions, whether the timing control signal in the valid image data of the VBO signal satisfies the preset condition relative to the timing control signal acquired by parsing after the previous handshake, except for a case where a comparison in the timing control signals is not needed only after a first interaction, analogously, if the timing control signal satisfies the preset condition for a successive preset number of handshakes during the subsequent successive handshakes, then terminate the multiple interactions which are performed currently.

After the Tcon board is powered on and stable, a handshake is performed between the Tcon board and the mainboard, after the handshake is performed between the Tcon board and the mainboard, transmission of the VBO signal may be performed to provide Normal Data (valid image data) for screen display in the display terminal.

In some exemplary embodiments, a process of the handshake between the Tcon board and the mainboard where the transmission of the VBO signal is performed includes:

(1) after the mainboard is powered on, the mainboard sets an HTPDN (Hot Plug Detect signal) and an LOCKN (Clock Data Recovery Lock signal) at high levels;

(2) after the Tcon board is powered on and remains at a stable state, the Tcon board pulls the HTPDN signal down; a CDR (clock data recovery) training is started between the mainboard and the Tcon board; after the CDR training succeeds, the LOCKN signal is pulled down;

(3) an ALN training (data format calibration) is started.

It can be seen that, the handshake between the mainboard and the Tcon board starts from pulling down the HTPDN signal, and the handshake between the mainboard and the Tcon board is completed after they are subject to the CDR training and the ALN training, after completion of the handshake, the Normal Date (the valid image data) starts to be performed, that is, a process of transmission of the VBO signal embedded with the timing control signal. These two processes, that is, the handshake between the mainboard and the Tcon board together with the subsequent transmission of the VBO signal therebetween, constitute an interaction process between the mainboard and the Tcon board.

That is to say, in the display terminal, after the system is powered on, through the multiple interactions executed between the mainboard and the Tcon board, when the timing control signal in the valid image data of the VBO signal is unstable after each of the interactions, a normality in screen display under the unstable timing control signal can be ensured through a next interaction which follows right after, moreover, the VBO signal is brought into a stable state as the multiple interactions proceed, and only the transmission of the display image data in the VBO signal is started after the stable state, rendering a screen in the display terminal to be displayed normally.

In some exemplary embodiments, where the if the timing control signal acquired by parsing successively satisfies the preset condition in a preset number of handshakes, then stopping repeating the interaction, may include the following steps:

after a first interaction, the Tcon board records the timing control signal acquired by parsing, and sets a first count value as an initial value.

After each interaction subsequent to the completion of the first interaction, the Tcon board compares the timing control signal acquired by parsing after a previous handshake with the timing control signal currently acquired by parsing, increases a count value to the first count value when the preset condition is satisfied by the two timing control signals, otherwise sets the first count value as the initial value, and stops repeating the interaction when the first count value reaches the preset number of handshakes.

It can be seen that an action performed by the Tcon board subsequent to the completion of the first interaction is different from an action completed by it after each interaction subsequent to the completion of the first interaction. Before the first interaction, the Tcon board is not recorded with the timing control signal, hence, after the first interaction, i.e., after the Tcon board shakes hands with the mainboard for the first time, and the Tcon board receives the VBO signal transmitted by the mainboard for the first time, the Tcon board may acquire a timing control signal by parsing the valid image data of the VBO signal, then record the timing control signal acquired by parsing, and may set a first count value as an initial value, the first count value herein is used to count the successive number of times for which the timing control signal satisfies the preset condition. Then, a second interaction is started, that is, performing a second handshake with the mainboard, moreover, after receiving a VBO signal transmitted by the mainboard for the second time, the Tcon board resolves the timing control signal from the valid image data of the VBO signal, and compares it with the timing control signal acquired by parsing after the previous handshake, i.e., the timing control signal acquired by parsing after the first interaction as recorded previously, when the preset condition is satisfied by the two timing control signals, increases a count value to the first count value, otherwise sets the first count value as the initial value, meanwhile a determination is performed, if the first count value reaches the preset number of handshakes, then stops repeating the interaction. Therefore, that the Tcon board records the timing control signal acquired by parsing for the first time, occurs before the second interaction, after the first interaction is completed and the Tcon board acquires the timing control signal by parsing; whereas that the Tcon board compares the timing control signal acquired by parsing after the previous handshake with the timing control signal currently acquired by parsing, occurs after the completion of each interaction which is subsequent to the completion of the first interaction, and the Tcon board acquires the current timing control signal by parsing, if a next interaction is determined to be necessary, then the comparing action occurs before the next interaction; if a next interaction is determined to be unnecessary, then the comparing action occurs before transmission of a timing control signal which enters into a stable state.

The multiple interactions are performed successively between the Tcon board and the mainboard, the parsing and the comparing of the timing control signal after each of the interactions both constitute a process for identifying signal stability which determines whether the timing control signal acquired by parsing after the current handshake satisfies the preset condition based on the timing control signal acquired by parsing after the previous handshake.

For an unstable VBO signal, that is, when the timing control signal embedded in the valid image data of the VBO signal transmitted after the handshake is unstable, normal display of a screen in the display terminal is ensured by a further handshake.

Furthermore, through the performed multiple handshakes, the timing control signal in the valid image data of the VBO signal can be brought into a stable state, thereby rendering a screen in the display terminal to be displayed normally.

In other words, a defect of abnormality in screen display due to an unstable timing control signal is solved through a further handshake, and the unstable timing control signal is converted to a stable timing control signal through multiple handshakes, thereby ensuring reliability in subsequent displays.

For the multiple interactions performed between the Tcon board and the mainboard, after each of the interactions, the Tcon board compares the timing control signal in the valid image data of the VBO signal with the timing control signal acquired by parsing after the previous handshake, performs counting when the preset condition is satisfied by the two timing control signals, no longer repeats the handshake with the mainboard when the counting reaches a preset number of handshakes, and terminates the current multiple interactions which are performed successively.

The counting is used to count the number of times for which the timing control signal acquired by parsing after the multiple handshakes stays at a desired stable state successively, thereby determining stability of the transmission of the VBO signal.

Figure 2:
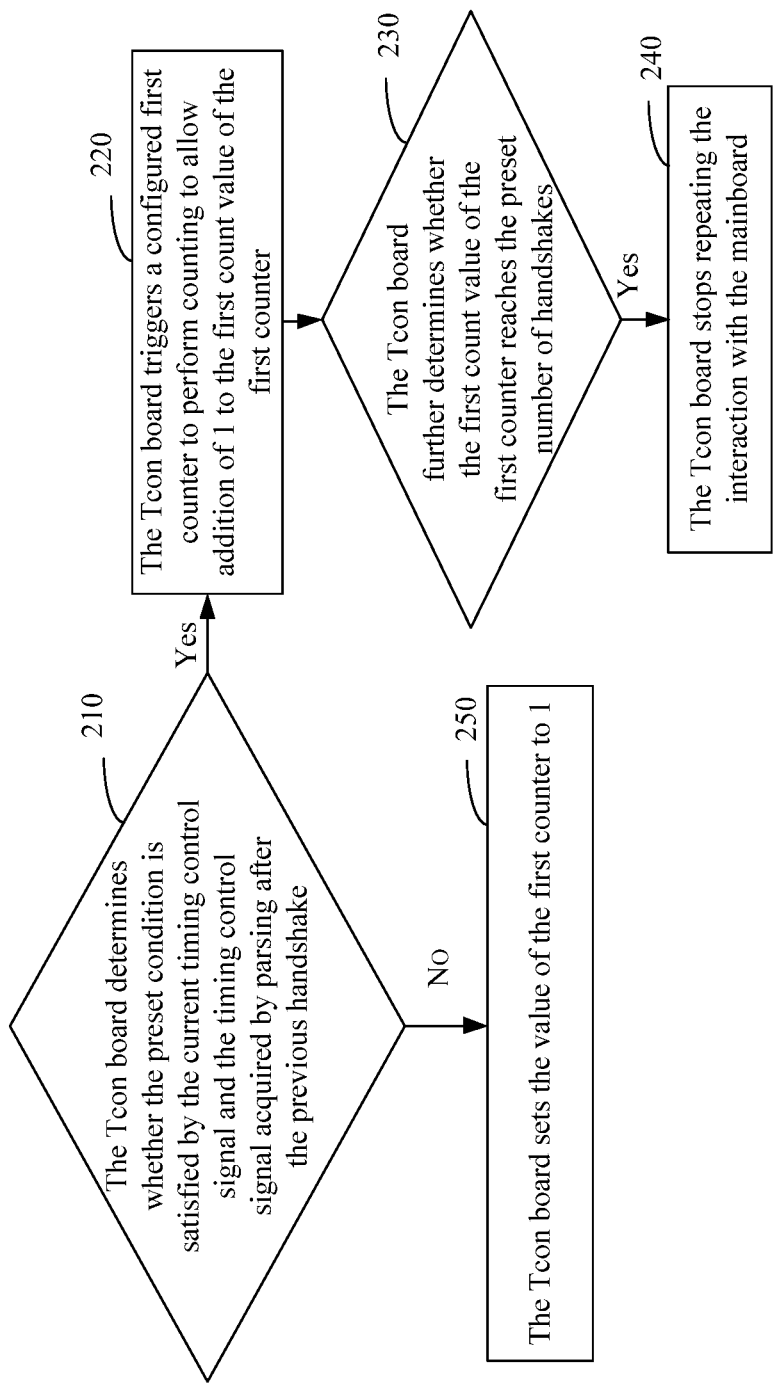
FIG. 2 is a flow chart describing details of a step where, the Tcon board compares a timing control signal acquired by parsing after a previous handshake with a timing control signal currently acquired by parsing, increases a count value to the first count value when the preset condition is satisfied by the two timing control signals, otherwise sets the first count value as the initial value, and stops repeating the interaction when the first count value reaches the preset number of handshakes, according to some embodiments of the present application.

FIG. 2 is a flow chart describing details of a step where, the Tcon board compares a timing control signal acquired by parsing after a previous handshake with a timing control signal currently acquired by parsing, increases a count value to the first count value when the preset condition is satisfied by the two timing control signals, otherwise sets the first count value as the initial value, and stops repeating the interaction when the first count value reaches the preset number of handshakes, according to some embodiments of the present application. The above-described initial value of a first counter is 1. As shown in FIG. 2, the following steps may be included.

In step 210, the Tcon board determines whether the preset condition is satisfied by the current timing control signal and the timing control signal acquired by parsing after the previous handshake, if yes, then proceed with step 220, if no, then proceed with step 250.

In step 220, the Tcon board triggers a configured first counter to perform counting to allow addition of 1 to the first count value of the first counter.

In step 230, the Tcon board further determines whether the first count value of the first counter reaches the preset number of handshakes, if yes, the Tcon board stops repeating the interaction with the mainboard in step 240.

In step 250, the Tcon board sets a value of the first counter to 1.

As described previously, after the first interaction, after receiving the VBO signal, the Tcon board resolves a timing control signal from valid image data of the VBO signal, and records it to be used as a timing control signal used for comparison after a next successful handshake, so as to provide a criterion for assessment of successive stable states in the display terminal.

A comparison is made to the timing control signal acquired by parsing after the current handshake based on the timing control signal acquired by parsing after the previous handshake, when the comparison between them is determined to satisfy the preset condition, the counting may be performed, that is, performing update of the number of times for which the timing control signal satisfies the preset condition.

The update of the number of times for which the timing control signal satisfies the preset condition may be achieved by configuring a first counter. If the preset condition can be satisfied by the timing control signal acquired by parsing after the current handshake and the timing control signal acquired by parsing after the previous handshake, then trigger the configured first counter to perform counting, that is, allow auto-increment of 1 to the first count value of the first counter.

When it is determined that the preset condition is not satisfied by the timing control signal acquired by parsing after the current handshake and the timing control signal acquired by parsing after the previous handshake, transmission of the timing control signal is shown unstable in the valid image data of the current VBO signal, and a re-detection of stability is necessary, that is, to interact again, thus, an abnormality in screen display due to the current unstable timing control signal in the valid image data of the VBO signal can be avoided by a further interaction.

As the multiple interactions are performed successively, after one interaction, it is determined whether the preset condition is satisfied by the timing control signal in the valid image data of the VBO signal and the timing control signal corresponding to the previous handshake, if yes, add 1 to the first count value of the first counter, if no, reset the first count value of the first counter to 1, repeat this till a value in the first counter reaches the preset number of handshakes.

When the first count value displayed in the first counter reaches the preset number of handshakes, it shows that successful handshakes have been successively performed between the Tcon board and the mainboard for the preset number of handshakes, the timing control signal in the valid image data of the VBO signal under transmission is at a stable state.

If the first count value of the first counter has not reached the preset number of handshakes, then return back to step 210, as interactions between the mainboard and the Tcon board are repeated continuously, perform a process for determining the timing control signal, repeat the cycle continuously till the first count value of the first counter reaches the preset number of handshakes.

Through the process as described above, after the interaction is repeated between the mainboard and the Tcon board, an implementation is provided for the counting when resolution and comparison are performed to the timing control signal, thereby realizing an effective timing control process between the mainboard and the Tcon board, and ensuring reliability of successive display communications.

In some exemplary embodiments, before the Tcon board compares the timing control signal currently acquired by parsing, a method for controlling transmission of the VBO signal further includes:

the Tcon board stores the timing control signal acquired by parsing, where the stored timing control signal is used for comparison with a timing control signal acquired by parsing after a next successful handshake to determine whether the preset condition is satisfied by the two timing control signals.

After each of the interactions, for the timing control signal acquired by parsing the valid image data of the VBO signal, the timing control signal at this moment is recorded, that is, respectively storing timing control signals acquired after each of the interactions to determine, after a next interaction, stability of the timing control signals corresponding to two consecutive interactions based on the timing control signal acquired after the current interaction.

In some exemplary embodiments, the first interaction refers to an interaction performed when there is no record of timing control signals, that is to say, when there is no record of timing control signals, the current interaction is regarded as the first interaction, and the Tcon board will record the timing control signal acquired by parsing after the first interaction.

In some exemplary embodiments, the counter may also be used to record the number of times of interactions to determine whether the current interaction is the first interaction. At this time, the first interaction may refer to an interaction performed when a second count value of a configured second counter is an initial value, where the second counter is used to record the number of times of interactions between the Tcon board and the mainboard. During an implementation, the second counter may be trigged by the Tcon board after the first interaction to perform counting, rendering addition of 1 to the second count value of the second counter, there is no sequential execution order between this counting action and the action where the Tcon board records the timing control signal acquired by parsing and sets the first count value as the initial value. The initial value of the second counter may be either 0 or 1, or other preset values. When the second count value of the second counter is the initial value, it indicates that the second count value of the second counter has not been increased, thus, the interaction at this time is the first interaction; when the second count value of the second counter is not the initial value, it indicates that the second count value of the second counter has been increased, that is, the interaction at this time is not the first interaction.

Taking a 4K*2K TV terminal where a VBO transmission protocol is applied as an example, the method for controlling transmission of the VBO signal is described with reference to an application scenario. For instance, FIG. 3 is a diagram of a handshake and timing control of transmission of a VBO signal after the handshake according to some embodiments of the present application.

Figure 3:
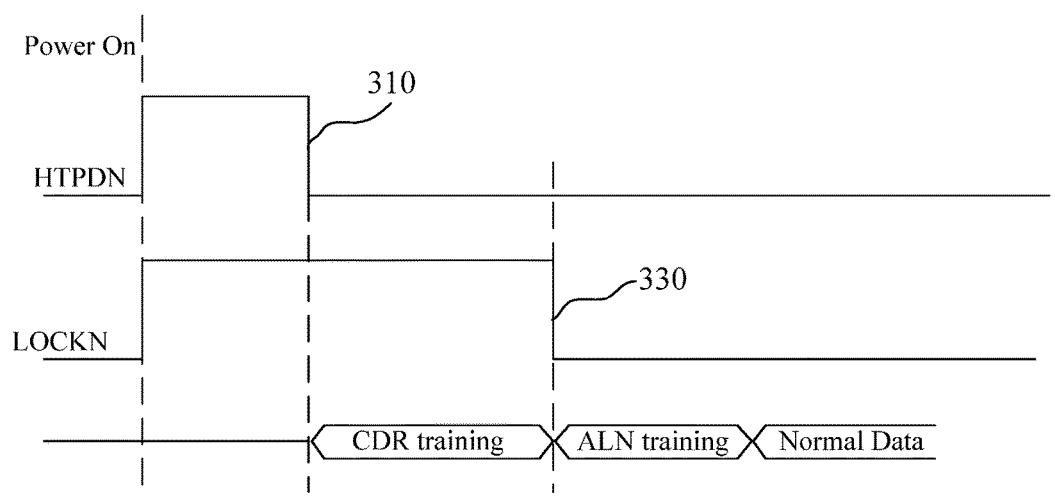
FIG. 3 is a diagram of a handshake and timing control of transmission of a VBO signal after the handshake according to some embodiments of the present application.

After being powered on, that is, the POWER ON stage as shown in FIG. 3, set an HTPDN signal and an LOCKN signal at high levels, moreover, after being powered on and stable, the Tcon board pulls the HTPDN signal down, that is, the stage 310 as shown in FIG. 3.

After the HTPDN signal is pulled down, start a CDR training; after the CDR training is successful, the LOCKN signal is pulled down, that is, as illustrated in the stage 330.

Figure 4:
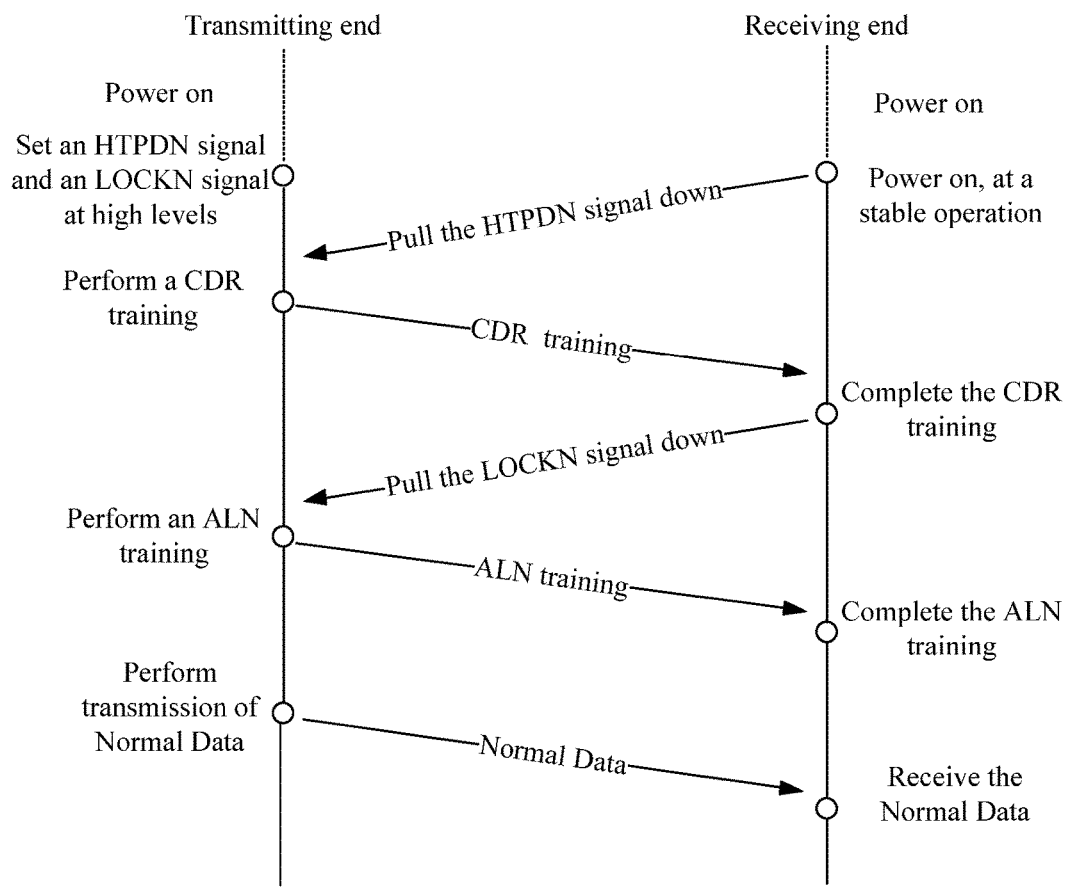
FIG. 4 is a sequence diagram where a mainboard interacts with a Tcon board according to some embodiments of the present application.

Hence, an ALN training may be performed to perform the transmission of Normal Data, that is, the transmission of the valid image data, reference may be made to FIG. 4 for a detailed timing control process between the mainboard and the Tcon board. FIG. 4 is a sequence diagram where a mainboard interacts with a Tcon board according to some embodiments of the present application.

A handshake between the mainboard and the Tcon board is completed through the process as described above, and then the display communication of the VBO signal is started.

Figure 5:
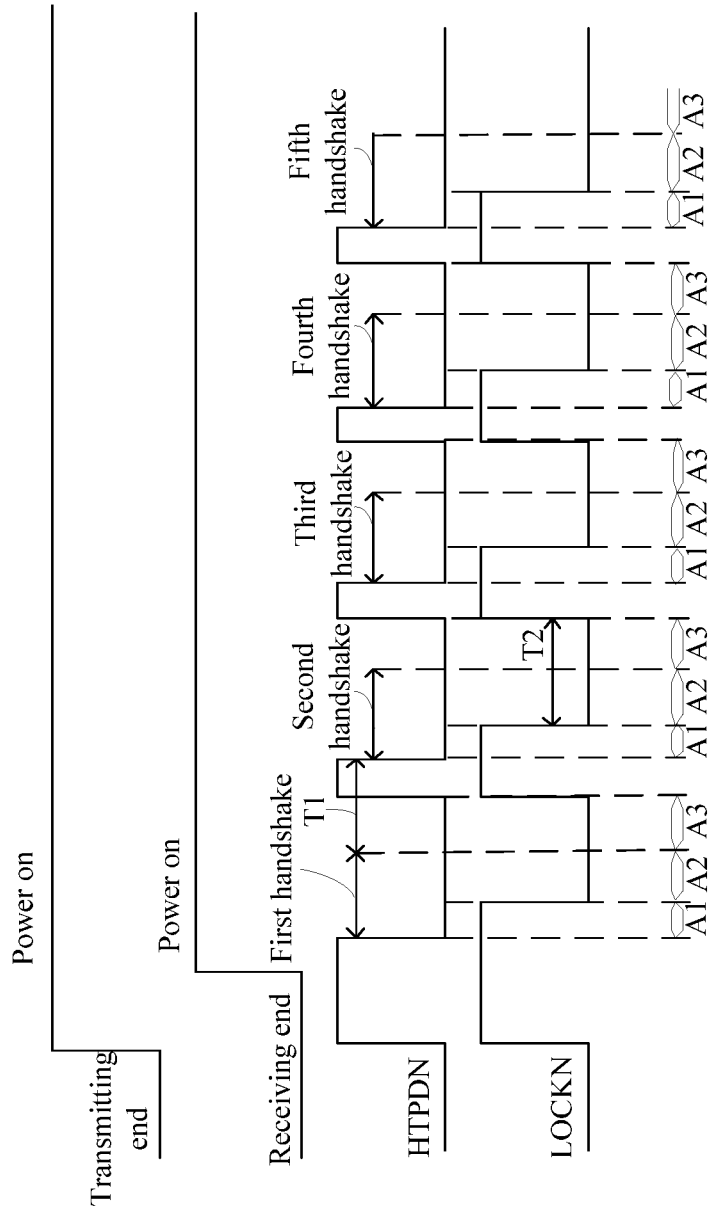
FIG. 5 is a schematic diagram of a process for timing control of transmission of a VBO signal according to some embodiments of the present application.

Based on this, for the method for controlling transmission of the VBO signal performed in the present application, FIG. 5 is a schematic diagram of a process for timing control of transmission of a VBO signal according to some embodiments of the present application.

It should be noted in FIG. 5 that, A1 represents the CDR training, A2 represents the ALN training, and A3 represents the Normal Data, as described previously, T1 is a time interval between two handshakes, and T2 refers to the time spent on the ALN training and the Normal Data.

As shown in FIG. 5, after the Tcon board is powered on and stable, the HTPDN signal is set at a low level for the first time, the mainboard starts to transmit a CDR training signal to perform the CDR training process, after the Tcon board locks this signal, the LOCKN signal is set at a low level, the mainboard starts to transmit an ALN training signal, and the first handshake is completed till then, after the completion, start to transmit the Normal Data.

After the first handshake is completed, the Tcon board starts to receive the Normal Data transmitted by the mainboard, that is, the valid image data, then resolves the timing control signal from a data signal, and records an htotal signal, a Vtotal signal and an HDE signal at this point, and meanwhile allows the first count value in the first counter to be set to 1. The Tcon board controls the HTPDN signal and the LOCKN signal to be set at high levels, and re-enters into a next interaction when the HTPDN signal is pulled down.

During the next interaction, the HTPDN signal is pulled down for the second time after a period of time T1, the mainboard starts to transmit the CDR training signal, and repeat the above interaction process.

After the second handshake is successful, when valid image data in the VBO signal transmitted by the mainboard is also received, resolve the timing control signal from the valid image data and record an htotal signal, a Vtotal signal and an HDE signal at this point.

Compare the htotal signal, the Vtotal signal and the HDE signal resolved at this time with the htotal signal, the Vtotal signal and the HDE signal resolved last time, if they are consistent, then add 1 to the first count value of the first counter, if inconsistent, then reset the first count value of the first counter to 1, and repeat the cycle continuously.

Meanwhile, the Tcon board determines the first count value of the first counter continuously, when the first count value of the first counter is less than the preset number of handshakes, for instance, 5, perform a next handshake with the mainboard for communications, when the first count value of the first counter is shown as 5, both the mainboard and the Tcon board enter into normal display communications.

Through the timing control described above, it is possible to effectively avoid an abnormality in display due to unstable timing control signals.

The following is some embodiments of an apparatus according to the present application, which may be used to perform the embodiments of the method for controlling transmission of the VBO signal according to the present application as described above. For details which have not been disclosed in the apparatus embodiment of the present application, reference may be made to the embodiments of the method for controlling transmission of the VBO signal according to the present application.

In some exemplary embodiments, an apparatus for controlling transmission of a VBO signal, which is used in a display terminal and performs the method for controlling transmission of the VBO signal as shown in FIG. 1, where the display terminal includes a mainboard and a Tcon board which use a VBO interface for communications.

The apparatus for controlling transmission of the VBO signal is configured to: after a system is powered on, control the Tcon board to perform multiple interactions with the mainboard according to a VBO signal transmission protocol.

After each handshake, control the Tcon board to acquire by parsing a timing control signal from valid image data of the received VBO signal transmitted by the mainboard, if the timing control signal acquired by parsing after the handshake satisfies a preset condition, which occurs for a successive preset number of handshakes, then stop repeating the handshake, and only perform transmission of display image data in the VBO signal.

In some exemplary embodiments, the apparatus for controlling transmission of the VBO signal also includes a comparing and counting module. The comparing and counting module is configured to compare a timing control signal acquired by parsing after a previous handshake with the timing control signal currently acquired by parsing, perform counting when the preset condition is satisfied by the two timing control signals, otherwise set the count value as an initial value, and stop repeating the handshake when the count value reaches the preset number of handshakes.

Figure 6:
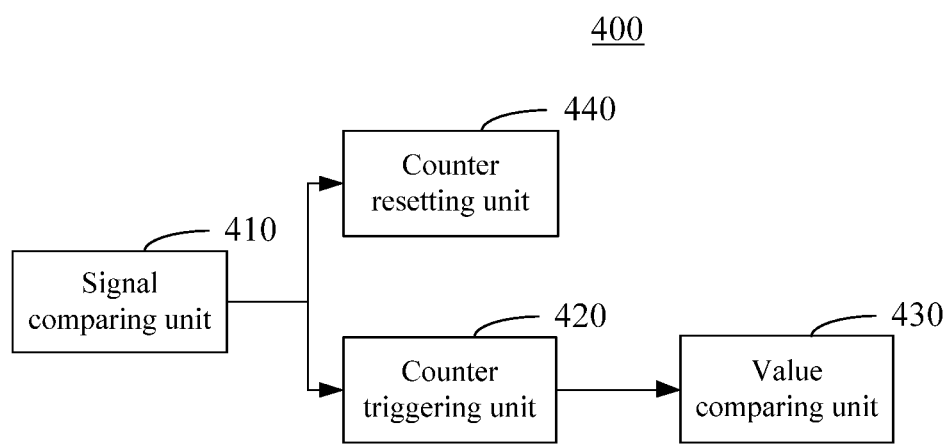
FIG. 6 is a block diagram of a comparing and counting module according to some embodiments of the present application.

FIG. 6 is a block diagram of a comparing and counting module 400 according to some embodiments of the present application. The comparing and counting module 400, as shown in FIG. 6, includes but is not limited to: a signal comparing unit 410, a counter triggering unit 420, a value comparing unit 430 and a counter resetting unit 440.

The signal comparing unit 410 is configured to determine whether the preset condition is satisfied by the timing control signal and the timing control signal acquired by parsing after the previous handshake, if yes, then notify the counter triggering unit 420, if no, then notify the counter resetting unit 440.

The counter triggering unit 420 is configured to trigger a configured first counter to perform counting to allow addition of 1 to a first count value of the first counter.

The value comparing unit 430 is configured to further determine whether the first count value of the first counter reaches the preset number of handshakes, if yes, then stop repeating the interaction with the mainboard.

The counter resetting unit 440 is configured to set a value of the counter to 1.

In some exemplary embodiments, the apparatus for controlling transmission of the VBO signal also includes a signal storing module. The signal storing module is configured to store the timing control signal acquired by parsing, where the stored timing control signal is used for comparison with a timing control signal acquired by parsing after a next successful handshake to determine whether the preset condition is satisfied by the two timing control signals.

Figure 7:
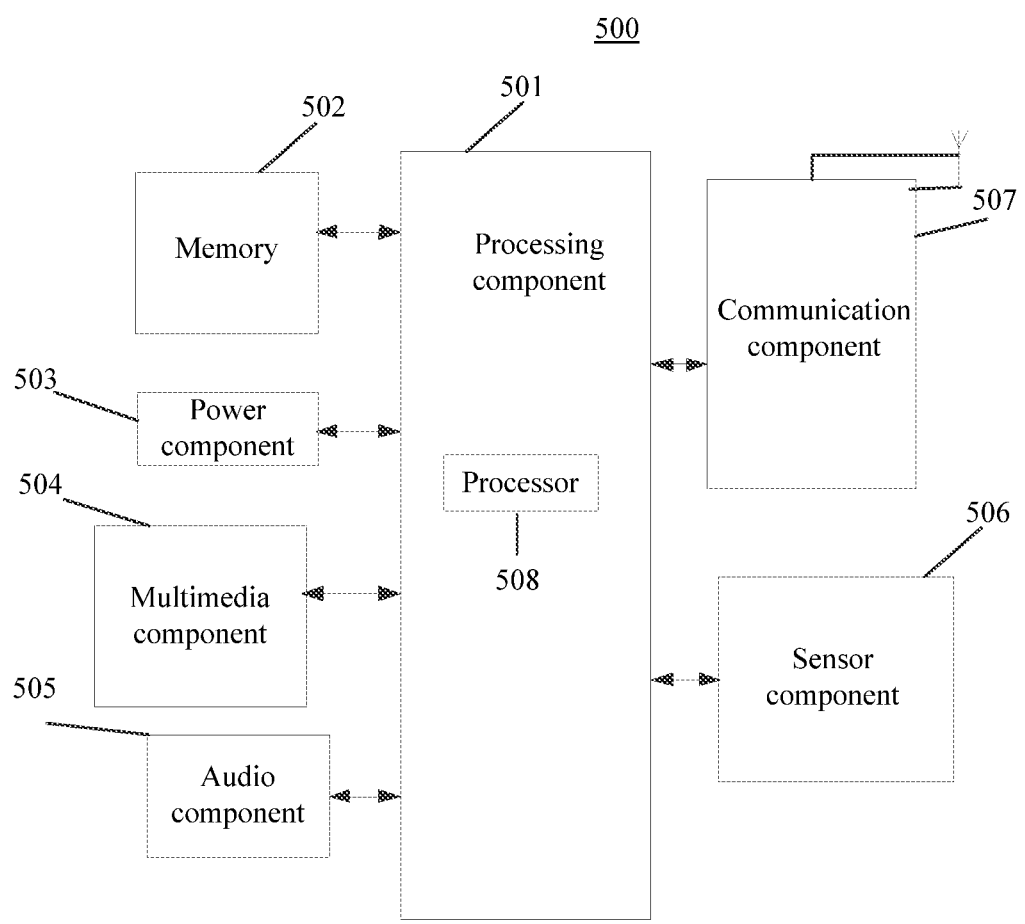
FIG. 7 is a block diagram of an apparatus according to some embodiments of the present application.

FIG. 7 is a block diagram of an apparatus 500 according to some embodiments of the present application. Reference may be made to FIG. 7; the apparatus 500 may include any one or more of the following components: a processing component 501, a memory 502, a power component 503, a multimedia component 504, an audio component 505, a sensor component 506 and a communication component 507.

The processing component 501 usually controls an overall operation of the apparatus 500, such as operations associated with display, telephone call, data communications, camera operations and recording operations. The processing component 501 may include one or more processors 508 to execute an instruction to complete all or a part of steps of the method as described below. In addition, the processing component 501 may include one or more modules for facilitating interactions between the processing component 501 and other components. For instance, the processing component 501 may include a multimedia module for facilitating interactions between the multimedia component 504 and the processing component 501.

The memory 502 is configured to store various types of data to support operations on the apparatus 500. An example of these data includes an instruction of any application program or method operated on the apparatus 500. The memory 502 may be implemented by any type of volatile or nonvolatile memory device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or a compact disk. The memory 502 is also stored with one or more modules that are configured to be executed by the one or more processors 508 to perform all or a part of steps of any method as shown in FIG. 1 and FIG. 2 below.

The power component 503 provides power to various components of the apparatus 500. The power component 503 may include a power management system, one or more power supplies, and other components associated with generating, managing, and distributing power for the apparatus 500.

The multimedia component 504 includes a screen that provides an output interface between the apparatus 500 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense a touch, a slide and a gesture on the touch panel. The touch sensor may not only sense boundaries of the touch or slide action, but also detect a duration and a pressure associated with the touch or slide operation. The screen may also include an organic electron luminescence display (OLED).

The audio component 505 is configured to output and/or input an audio signal. For instance, the audio component 505 includes a microphone (MIC) that is configured to receive an external audio signal when the apparatus 500 is in an operating mode, such as a call mode, a record mode and a voice recognition mode. The received audio signal may be further stored in the memory 502 or transmitted via the communication component 507. In some embodiments, the audio component 505 also includes a loudspeaker for outputting an audio signal.

The sensor component 506 includes one or more sensors for providing a status assessment in various aspects for the apparatus 500. For instance, the sensor component 506 may detect an open/closed state of the apparatus 500 and a relative positioning of the components. The sensor component 506 may also detect a position change of the apparatus 500 or one component of the apparatus 500, and a temperature change of the apparatus 500. In some embodiments, the sensor component 506 may also include a magnetic sensor, a pressure sensor, or a temperature sensor.

The communication component 507 is configured to facilitate wired or wireless communications between the apparatus 500 and other devices. The apparatus 500 may access a wireless network based on a communication standard, such as a WiFi. In some exemplary embodiments, the communication component 507 receives a broadcast signal or broadcast-related information from an external broadcast management system via a broadcast channel. In some exemplary embodiments, the communication component 507 also includes a near field communication (NFC) module to facilitate short-range communications. For instance, the NFC module may be implemented based on radio frequency identification (RFID) technologies, infrared data association (IrDA) technologies, ultra wideband (UWB) technologies, Bluetooth (BT) technologies and other technologies.

In an exemplary embodiment, the apparatus 500 may be implemented by one or more application integrated circuits (ASIC), digital signal processors (DSP), digital signal processing devices (DSPD), programmable logic devices (PLD), field programmable gate arrays (FPGA), controllers, microcontrollers, microprocessors or other electronic elements for performing the method described above.

Alternatively, the present application also provides an apparatus for controlling transmission of a VBO signal, where the apparatus for controlling transmission of the VBO signal is used to perform all or a part of steps of any method for controlling transmission of the VBO signal described in FIG. 1 and FIG. 2. The apparatus includes:

a processor; and a memory used to store processor-executable instructions; where the processor is coupled to the memory, and is configured to execute the instructions stored in the memory, and the processor is configured to:

after a system is powered on, control the Tcon board to perform multiple interactions between the Tcon board and the mainboard according to a VBO signal transmission protocol, wherein the interaction comprises a handshake and transmission of the VBO signal after the handshake is completed;

after each of the interactions, control the Tcon board to acquire a timing control signal by parsing valid image data of a received VBO signal transmitted by the mainboard, and if the timing control signal acquired by parsing successively satisfies a preset condition in a preset number of handshakes, then stop repeating the interaction, and only perform transmission of display image data in the VBO signal.

In some exemplary embodiments, the processor is configured to: after a first interaction, control the Tcon board to record the timing control signal acquired by parsing, and set a first count value as an initial value; and after each interaction subsequent to the completion of the first interaction, control the Tcon board to compare a timing control signal acquired by parsing after a previous handshake with the timing control signal currently acquired by parsing, increase a count value to the first count value when the preset condition is satisfied by the two timing control signals, otherwise set the first count value as the initial value, and stop repeating the interaction when the first count value reaches the preset number of handshakes.

In some exemplary embodiments, the initial value is 1, the processor is configured to: control the Tcon board to determine whether the preset condition is satisfied by the current timing control signal and the timing control signal acquired by parsing after the previous handshake, if yes, then trigger a configured first counter to perform counting to allow addition of 1 to the first count value of the first counter, if no, then set the first count value of the first counter to 1; and further control the Tcon board to determine, whether the first count value of the first counter reaches the preset number of handshakes, if yes, stop repeating the interaction with the mainboard.

In some exemplary embodiments, the memory is configured to: control the Tcon board to store the timing control signal acquired by parsing, where the stored timing control signal is used for comparison with a timing control signal acquired by parsing after a next successful handshake to determine whether the preset condition is satisfied by the two timing control signals.

In some exemplary embodiments, the first interaction refers to an interaction performed when there is no record of the timing control signal.

In some exemplary embodiments, the first interaction refers to an interaction performed when a second count value of a configured second counter is an initial value, where the second counter is used to record the number of times of the interactions between the Tcon board and the mainboard.

In some exemplary embodiments, the processor is further configured to: after the first interaction, control the Tcon board to trigger the second counter to perform counting to allow addition of 1 to the second count value of the second counter.

In some exemplary embodiments, the handshake includes: after the mainboard is powered on, control the mainboard to set a hot plug detect control angle HTPDN signal and a clock lock control angle LOCKN signal at high levels; after the Tcon board is powered on and remains at a stable state, control the Tcon board to pull the HTPDN signal down; control the mainboard and the Tcon board to start a clock and data recovery, after a successful clock and data recovery, control the Tcon board to pull the LOCKN signal down; and control the mainboard and the Tcon board to complete a data format calibration.

In some exemplary embodiments, the transmission of the VBO signal includes: the mainboard transmits the valid image data of the VBO signal to the Tcon board; and the Tcon board receives the valid image data of the VBO signal transmitted by the mainboard.

Alternatively, the present application also provides a display terminal including: a liquid crystal display panel, a mainboard, a Tcon board and an apparatus for controlling transmission of a VBO signal as described above, where the apparatus for controlling the transmission of the VBO signal is used to control image display in the liquid crystal display panel;

the apparatus for controlling the transmission of the VBO signal includes a memory storing instructions; a processor coupled with the memory and configured to execute instructions stored in the memory, and the processor is configured to:

after a system is powered on, control the Tcon board to perform multiple interactions between the Tcon board and the mainboard according to a VBO signal transmission protocol, wherein the interaction comprises a handshake and transmission of the VBO signal after the handshake is completed;

after each of the interactions, control the Tcon board to acquire a timing control signal by parsing valid image data of a received VBO signal transmitted by the mainboard, and if the timing control signal acquired by parsing successively satisfies a preset condition in a preset number of handshakes, then stop repeating the interaction, and only perform transmission of display image data in the VBO signal.

In an exemplary embodiment, a storage medium is also provided, which is a computer-readable storage medium, for instance, which may be a temporary and non-temporary computer-readable storage medium that includes instructions. The storage medium refers to, for instance, a memory 502 that includes instructions, the described instructions can be executed by the processor 508 of the apparatus 500 to perform the method for controlling transmission the VBO signal as described above.

It will be appreciated that the present application is not limited to the precise structure as described above and shown in the accompany drawings, and various modifications and changes may be made without departing from the scope thereof. The scope of the present application is only subject to the appended claims.

What is claimed is:

1. A method for controlling transmission of a V-By-One (VBO) signal for use in a display terminal, wherein the display terminal comprises a mainboard and a Tcon board which use a VBO interface for communications, and the method comprises:

after the display terminal is powered on, performing multiple interactions between the Tcon board and the mainboard according to a VBO signal transmission protocol, wherein each of the interactions comprises a handshake and transmission of the VBO signal from the mainboard to the Tcon board after the handshake is completed;

after each of the interactions, acquiring, by the Tcon board, a timing control signal by parsing valid image data of the VBO signal transmitted from the mainboard, and if the timing control signal acquired after a present number of handshakes successively satisfies a preset condition, then stopping proceeding with a next interaction, wherein the preset condition is used to identify whether timing control signals which are successively acquired are identical to each other.

2. The method according to claim 1, wherein the acquiring, by the Tcon board, the timing control signal by parsing valid image data of the VBO signal transmitted from the mainboard, and if the timing control signal acquired after a present number of handshakes successively satisfies a preset condition, then stopping proceeding with the next interaction, comprising:

after a first interaction, recording, by the Tcon board, the timing control signal acquired, and setting a first count value to be equal an initial value; and after each interaction subsequent to the completion of the first interaction, comparing, by the Tcon board, the timing control signal acquired after a previous handshake with the timing control signal currently acquired, increasing a count value to the first count value when the preset condition is satisfied by the two timing control signals, otherwise setting the first count value to be equal to the initial value, and stopping proceeding with the next interaction when the first count value reaches a preset number.

3. The method according to claim 2, wherein the initial value is 1, the comparing, by the Tcon board, the timing control signal acquired after the previous handshake with the timing control signal currently acquired, increasing the count value to the first count value when the preset condition is satisfied by the two timing control signals, otherwise setting the first count value to be equal to the initial value, and stopping proceeding with the next interaction when the first count value reaches the preset number, comprising:

determining, by the Tcon board, whether the preset condition is satisfied by the current timing control signal and the timing control signal acquired after the previous handshake, if yes, then triggering a configured first counter to perform counting to allow addition of 1 to the first count value of the first counter, if no, then setting the first count value of the first counter to be equal to 1; and further determining, by the Tcon board, whether the first count value of the first counter reaches the preset number, if yes, stopping proceeding with the next interaction with the mainboard.

4. The method according to claim 2, wherein, before the comparing, by the Tcon board, the timing control signal currently acquired, further comprising:

storing, by the Tcon board, the timing control signal acquired, wherein the stored timing control signal is used for comparison with a timing control signal acquired after a next successful handshake to determine whether the preset condition is satisfied by the two timing control signals.

5. The method according to claim 2, wherein the first interaction refers to an interaction performed when there is no record of the timing control signal.

6. The method according to claim 2, wherein the first interaction refers to an interaction performed when a second count value of a configured second counter is an initial value, wherein the second counter is used to record the number of times of the interactions between the Tcon board and the mainboard.

7. The method according to claim 6, further comprising:

after the first interaction, triggering, by the Tcon board, the second counter to perform counting to allow addition of 1 to the second count value of the second counter.

8. The method according to claim 1, wherein the handshake comprises:

setting, by the mainboard, a Hot Plug Detect signal (HTPDN) and a Clock Data Recovery Lock signal (LOCKN) at high levels; and pulling, by the Tcon board, the HTPDN signal down;

a clock and data recovery (CDR) training being started between the mainboard and the Tcon board, after a successful CDR training, pulling, by the Tcon board, the LOCKN signal down;

a data format calibration training (ALN training) being completed between the mainboard and the Tcon board.

9. The method according to claim 1, wherein the transmission of the VBO signal comprises:

transmitting, by the mainboard, the valid image data of the VBO signal to the Tcon board; and receiving, by the Tcon board, the valid image data of the VBO signal transmitted from the mainboard.

10. The method according to claim 1, wherein the method further comprises:

in response to stopping proceeding with the next interaction, only performing transmission of display image data in the VBO signal.

11. The method according to claim 1, wherein the method further comprises:

in response to stopping proceeding with the next interaction, both the mainboard and the Tcon board enter into normal display communications.

12. An apparatus for controlling transmission of a V-By-One (VBO) signal for use in a display terminal, wherein the display terminal comprises a mainboard and a Tcon board which use a VBO interface for communications, and the apparatus comprises a memory storing instructions; a processor coupled with the memory and configured to execute instructions stored in the memory, and the processor is configured to:

after the display terminal is powered on, control the Tcon board to perform multiple interactions between the Tcon board and the mainboard according to a VBO signal transmission protocol, wherein each of the interactions comprises a handshake and transmission of the VBO signal from the mainboard to the Tcon board after the handshake is completed;

after each of the interactions, control the Tcon board to acquire a timing control signal by parsing valid image data of the VBO signal transmitted from the mainboard, and if the timing control signal acquired after a present number of handshakes successively satisfies a preset condition, then stop proceeding with a next interaction, wherein the preset condition is used to identify whether timing control signals which are successively acquired are identical to each other.

13. The apparatus according to claim 12, wherein the processor is configured to:
after a first interaction, control the Tcon board to record the timing control signal acquired, and set a first count value to be equal an initial value; and
after each interaction subsequent to the completion of the first interaction, control the Tcon board to compare a timing control signal acquired after a previous handshake with the timing control signal currently acquired, increase a count value to the first count value when the preset condition is satisfied by the two timing control signals, otherwise set the first count value to be equal to the initial value, and stop proceeding with the next interaction when the first count value reaches a preset number.

14. The apparatus according to claim 13, wherein the initial value is 1, the processor is configured to:
control the Tcon board to determine whether the preset condition is satisfied by the control signal and the timing control signal acquired after the previous handshake, if yes, then trigger a configured first counter to perform counting to allow addition of 1 to the first count value of the first counter, if no, then set the first count value of the first counter to be equal to 1; and
further control the Tcon board to determine, whether the first count value of the first counter reaches the preset number, if yes, stop proceeding with the next interaction with the mainboard.

15. The apparatus according to claim 13, wherein, the memory is configured to:
control the Tcon board to store the timing control signal acquired, wherein the stored timing control signal is used for comparison with a timing control signal acquired after a next successful handshake to determine whether the preset condition is satisfied by the two timing control signals.

16. The apparatus according to claim 13, wherein the first interaction refers to an interaction performed when there is no record of the timing control signal.

17. The apparatus according to claim 13, wherein the first interaction refers to an interaction performed when a second count value of a configured second counter is an initial value, wherein the second counter is used to record the number of times of the interactions between the Tcon board and the mainboard.

18. The apparatus according to claim 17, wherein the processor is further configured to:
after the first interaction, control the Tcon board to trigger the second counter to perform counting to allow addition of 1 to the second count value of the second counter.

19. A method for controlling transmission of a V-By-One (VBO) signal for use in a display terminal, wherein the display terminal comprises a mainboard and a Tcon board which use a VBO interface for communications, and the method comprises:
performing, by the Tcon board and the mainboard, a first handshake according to a VBO signal transmission protocol;
after the first handshake is completed, sending, by the main board, a first normal data of the VBO signal to the Tcon board;
acquiring, by the Tcon board, a first timing control signal by parsing the first normal data;
performing, by the Tcon board and the mainboard, a second handshake according to the VBO signal transmission protocol;
after the second handshake is completed, sending, by the main board, a second normal data of the VBO signal to the Tcon board;
acquiring, by the Tcon board, a second timing control signal by parsing the second normal data;
comparing, by the Tcon board, the first timing control signal with the second timing control signal to determine whether a preset condition is satisfied by the first timing control signal and the second timing control signal, wherein the preset condition is used to identify whether timing control signals which are successively acquired are identical to each other;
in response to a number, which is a number of times for which the preset condition is satisfied, is under a preset number, performing, by the Tcon board and the mainboard, a third handshake according to the VBO signal transmission protocol;
after the third handshake is completed, sending, by the main board, a third normal data of the VBO signal to the Tcon board.

20. A method for controlling transmission of a V-By-One (VBO) signal for use in a display terminal, wherein the display terminal comprises a mainboard and a Tcon board which use a VBO interface for communications, and the method comprises:
performing, by the Tcon board and the mainboard, a first interaction between the Tcon board and the mainboard according to a VBO signal transmission protocol, wherein the first interaction comprises a first handshake and transmission of a first normal data of the VBO signal from the mainboard to the Tcon board after the first handshake is completed;
acquiring, by the Tcon board, a first timing control signal by parsing the first normal data;
comparing, by the Tcon board, the first timing control signal with a previous timing control signal to determine whether a preset condition is satisfied by the first timing control signal and the previous timing control signal, wherein the previous timing control signal is parsed from a previous normal data, and the previous normal data is received by the Tcon board during a previous interaction, and wherein the preset condition is used to identify whether timing control signals which are successively acquired are identical to each other;
in response to a number, which is a number of times for which the preset condition is satisfied, is under a preset number, performing, by the Tcon board and the mainboard, a subsequent interaction between the Tcon board and the mainboard according to the VBO signal transmission protocol.

* * * * *